(12) United States Patent
Mochizuki

(10) Patent No.: US 8,125,607 B2
(45) Date of Patent: Feb. 28, 2012

(54) ELECTRO OPTICAL DEVICE AND ELECTRONIC APPARATUS EQUIPPED WITH THE SAME

(75) Inventor: Hiroaki Mochizuki, Chino (JP)

(73) Assignee: Seiko Epson Corporation, Tokyo (JP)

( * ) Notice: Subject to any disclaimer, the term of this patent is extended or adjusted under 35 U.S.C. 154(b) by 186 days.

(21) Appl. No.: 11/789,097

(22) Filed: Apr. 23, 2007

(65) Prior Publication Data

US 2007/0247582 A1    Oct. 25, 2007

(30) Foreign Application Priority Data

Apr. 25, 2006   (JP) ................................. 2006-120552

(51) Int. Cl.
   *G02F 1/1339*   (2006.01)
   *G02F 1/1333*   (2006.01)
   *G02F 1/1345*   (2006.01)
(52) U.S. Cl. ........................... 349/153; 349/40; 349/149
(58) Field of Classification Search .......... 349/149–153, 349/40; 324/770
   See application file for complete search history.

(56) References Cited

U.S. PATENT DOCUMENTS

| | | | | |
|---|---|---|---|---|
| 5,396,356 A * | 3/1995 | Fukuchi | | 349/153 |
| 5,619,358 A * | 4/1997 | Tanaka et al. | | 349/143 |
| 5,731,854 A * | 3/1998 | Kishida | | 349/40 |
| 5,914,763 A * | 6/1999 | Fujii et al. | | 349/149 |
| 5,982,470 A * | 11/1999 | Nakahara et al. | | 349/153 |
| 5,995,189 A * | 11/1999 | Zhang | | 349/153 |
| 6,261,883 B1 * | 7/2001 | Koubuchi et al. | | 438/197 |
| 6,373,544 B1 * | 4/2002 | Hirabayashi | | 349/149 |
| 6,392,631 B1 * | 5/2002 | Bertin et al. | | 345/103 |
| 6,433,767 B1 | 8/2002 | Murade | | |
| 6,433,841 B1 | 8/2002 | Murade et al. | | |
| 6,611,301 B2 | 8/2003 | Murade et al. | | |
| 6,703,997 B2 * | 3/2004 | Murade | | 345/92 |
| 6,720,944 B1 * | 4/2004 | Ishii et al. | | 345/87 |
| 6,897,932 B2 | 5/2005 | Murade et al. | | |
| 7,196,353 B2 | 3/2007 | Murade | | |
| 7,580,086 B2 * | 8/2009 | Lee et al. | | 349/40 |
| 7,652,728 B2 * | 1/2010 | Isami et al. | | 349/40 |
| 2005/0269702 A1 * | 12/2005 | Otsuka | | 257/750 |

FOREIGN PATENT DOCUMENTS

| | | |
|---|---|---|
| JP | 2000-081636 | 3/2000 |
| JP | 2000-187236 | 7/2000 |
| JP | 2000-231113 A | 8/2000 |
| JP | 2001-133768 A | 5/2001 |

(Continued)

*Primary Examiner* — Mark Robinson
*Assistant Examiner* — Robert Tavlykaev
(74) *Attorney, Agent, or Firm* — AdvantEdge Law Group, LLC

(57) ABSTRACT

An electro optical device includes a first substrate, a plurality of pixel electrodes arranged at a predetermined pixel pitch on the first substrate, signal lines and electron devices disposed on the lower side than the pixel electrodes through an interlayer insulation film in a pixel area in which the plurality of pixel electrodes are arranged and electrically connected to the pixel electrodes, a second substrate oppositely disposed to the first substrate, a sealing material for bonding the first substrate and the second substrate together in a seal area along a periphery of the pixel area, and a plurality of dummy wirings arranged at an arrangement pitch equivalent to the predetermined pixel pitch along the periphery of the pixel area in at least a part of the seal area on the first substrate and formed by the same film as at least one of conducting films constituting the signal lines and the electron devices.

7 Claims, 6 Drawing Sheets

FOREIGN PATENT DOCUMENTS

| | | |
|---|---|---|
| JP | 2003-122313 | 4/2003 |
| JP | 2003-302916 A | 10/2003 |
| JP | 2003-344868 A | 12/2003 |
| JP | 2005-43417 A | 2/2005 |
| JP | 2005-077636 | 3/2005 |
| JP | 2005-92218 A | 4/2005 |

* cited by examiner

ELECTRO OPTICAL DEVICE AND ELECTRONIC APPARATUS EQUIPPED WITH THE SAME

BACKGROUND

1. Technical Field

The present invention relates to a technical field of an electro optical device such as, for example, a liquid crystal device and the like, and an electronic apparatus such as, for example, a liquid crystal projector and the like equipped with the same.

2. Related Art

In such a type of electro optical device, for example, a pair of substrates are bonded together by a sealing material in a seal area through a predetermined space and an electro optical material such as liquid crystal or the like is enclosed between the substrates. Pixel electrodes, scanning lines for selectively driving the pixel electrodes, data lines, and TFTs (Thin Film Transistors) as pixel switching elements are formed in a display area on an element substrate among the pair of the substrates through an interlayer insulating film as a laminated structure and constructed to allow active matrix driving. Further, in a peripheral area (including the seal area) around the display area on the element substrate, video signal lines for supplying video signals and the like are formed as a laminated structure.

In addition, in order to reduce a possibility of occurrence of disturbance in the alignment state of the electro optical material, a planarization process such as chemical mechanical polishing (CMP) or the like is subjected to concavities and convexities generated on a surface of the element substrate caused by the above described laminated structure.

On the other hand, in such a type of electro optical device, a driving system in which a video signal which should be supplied to N data lines is input by time division and a plurality of data lines among N is selected by time division to supply the video signal (that is, hybrid system or demultiplexer system) may be employed (for example, see JP-A-2005-43417).

However, in with the above described electro optical device, the number of wirings laminated in the seal area is small as compared with the number of wirings and the like laminated in the display area, so that there is a technical problem in that the surface of the element substrate is difficult to be evenly planarized even when the planarization process is subjected to the concavities and convexities generated on the surface of the element substrate. Moreover, in the electro optical device in which the above described hybrid system is employed, one video signal line corresponds for every N data lines, so that the difference of the numbers of the wirings in the display area and the seal area increases. Accordingly, there is a problem in that the even planarization of the surface of the element substrate becomes increasingly difficult. In addition, the video signal line is generally wired only in a region along one side of the element substrate in the seal area, which generates a biased distribution of the concavities and convexities in the seal area. Accordingly, there is also a technical problem in that it becomes difficult to keep the element substrate and the counter substrate at a predetermined distance with the sealing material.

SUMMARY

An advantage of some aspects of the invention is that it provides an electro optical device including a first substrate, a plurality of pixel electrodes arranged at a predetermined pixel pitch on the first substrate signal lines and electron devices disposed on the lower side than the pixel electrodes through an interlayer insulation film in a pixel area in which the plurality of pixel electrodes are arranged and electrically connected to the pixel electrodes, a second substrate oppositely disposed to the first substrate, a sealing material for bonding the first substrate and the second substrate together in a seal area along a periphery of the pixel area, and a plurality of dummy wirings arranged at an arrangement pitch equivalent to the predetermined pixel pitch along the periphery of the pixel area in at least a part of the seal area on the first substrate and formed by the same film as at least one of conducting films constituting the signal lines and the electron devices.

In the electro optical device of the invention, pixel electrodes constituted by, for example, a transparent conducting film are arranged, for example, in a matrix manner at a predetermined pixel pitch in the pixel area on the first substrate formed by, for example, a glass substrate, a quartz substrate, or the like. The "predetermined pixel pitch" according to the invention refers to an interval or distance between the centers of the pixel electrodes adjacent to each other, and when intervals along each direction of X direction along one sides of the first substrate and Y direction crossing the one side are different, refers to each of the intervals. Further, signal lines such as a plurality of scanning lines and data lines and the like disposed so as to cross each other and the electron devices for a pixel switch corresponding to each pixel electrode are formed on the lower side than the pixel electrodes through the interlayer insulation film. That is, the signal lines and the electron devices are laminated on the first substrate through the interlayer insulation film and the pixel electrodes are laminated on the upper side than the pixel electrodes. The first substrate on which the pixel electrodes are formed in such a manner and the second substrate formed by, for example, a glass substrate on which, for example, counter substrates are formed are bonded together by a sealing material formed by, for example, an optical-setting resin in the seal area through a predetermined distance (that is, a gap between the substrates) so that the first and second substrates are opposed. A gap material, for example, in a bead state or a fiber state for defining the predetermined distance between the first and the second substrates is enclosed in the sealing material. An electro optical material such as liquid crystal or the like are enclosed between the first and second substrates bonded together in such a manner. During operation of the electro optical device, a voltage is applied to the electro optical material such as liquid crystal or the like between the pixel electrodes and the counter electrodes based on, for example, a video signal or the like supplied from video signal lines to perform image display in the pixel area.

Particularly in the embodiment, a plurality of dummy wirings formed by the same film as at least one of the conducting films constituting the signal lines and the electron devices are arranged at an arrangement pixel pitch equivalent to the predetermined pixel pitch along the periphery of the pixel area in at least a part of the seal area on the first substrate. The "same film" according to the invention refers to a film formed at the same time during the manufacturing process and is a film of the same kind. Note that "formed by the same film" does not intend to require that the film is formed by one contiguous film and basically intends that the same film may be separated into film portions. Further, "arranged at an arrangement pixel pitch equivalent to the predetermined pixel pitch" intends that, besides the case where the plurality of dummy wirings are arranged at the perfectively same arrangement pitch as the predetermined pixel pitch, the case where the difference of the arrangement pitch of the plurality of dummy wirings and the predetermined pixel pitch is in a range which is not brought into practical question is included.

That is, for example, the dummy wirings extending in the Y direction are arranged along the X direction at the arrangement pitch equivalent to the predetermined pixel pitch in the X direction in a seal area along the X direction among the seal area surrounding the periphery of the pixel area, and the dummy wirings extending in the X direction are arranged along the Y direction at the arrangement pitch equivalent to the predetermined pixel pitch in the Y direction in a seal area along the Y direction among the seal area surrounding the periphery of the pixel area.

Accordingly, the difference between the concavities and convexities which may be generated on the surface of the first substrate in the seal area and the concavities and convexities which may be generated on the surface of the first substrate in the pixel area can be reduced. That is, the concavities and convexities caused by the laminated structure in the pixel area can be simulated by the plurality of dummy wirings arranged at the arrangement pitch equivalent to the predetermined pixel pitch in the seal area. In other words, with the plurality of dummy wirings, the concavities and convexities on the surface in the seal area and the pixel area on the first substrate can be almost evenly or perfectly evenly generated. Accordingly, by subjecting a planarization process such as CMP or the like with respect to the concavities and convexities generated on the surface of the first substrate (or the surface of the interlayer insulating film on the lower side than the pixel electrodes laminated on the first substrate), the flatness of the surface of the first substrate after removal of the concavities and convexities can be enhanced. Herewith, the possibility of the occurrence of the disturbance in the alignment state of the electro optical material such as liquid crystal or the like can be reduced. Moreover, the situation in which to keep the first substrate and the second substrate at a predetermined distance with the sealing material (in other words, the gap material included in the sealing material) becomes difficult caused by the concavities and convexities on the surface in the seal area on the first substrate can be prevented.

Moreover, particularly in the invention, the plurality of dummy wirings are arranged at the arrangement pitch equivalent to a predetermined pixel pitch. Accordingly, the sealing material can be evenly cured when the sealing material formed by, for example, an optical-setting resin is cured by emitting light, for example, ultraviolet ray (UV light) or the like from the first substrate side. That is, the sealing material can be cured by almost evenly or practically perfectively evenly transmitting the light emitted from the first substrate side through the gaps between the adjacent dummy wirings provided for each predetermined pixel pitch.

As described above, with the liquid crystal device according to the invention, the plurality of dummy wirings are arranged at the arrangement pitch equivalent to a predetermined pixel pitch in the seal area of the first substrate, so that the concavities and convexities caused by the laminated structure in the pixel area can be simulated and the flatness of the surface of the first substrate can be enhanced. Accordingly, the possibility of the occurrence of the disturbance in the alignment state of the electro optical material can be reduced and the first substrate and the second substrate can be surely kept at a predetermined distance by the sealing material.

According to another aspect of the electro optical device of the invention, a plurality of video signal terminals to which a video signal is supplied provided along one side of the first substrate, and a plurality of video signal lines each electrically connected to corresponding one of the plurality of video signal terminals and each having a wiring portion wired along the direction crossing the one side in a region along the one side among the seal area are included on the first substrate. At least a part of the plurality of dummy wirings is arranged between the wiring potions of the video signal lines adjacent to each other so that an arrangement pitch with the wiring potions is to be equal to the predetermined pixel pitch.

According to the aspect, in the seal area, at least a part of the plurality of dummy wirings is arranged so that the arrangement pitch with the wiring potions of the video signal lines along the direction crossing the one side (that is, the Y direction) is equal to the predetermined pixel pitch. That is, the part of the plurality of dummy lines is arranged at an arrangement pitch equivalent to the predetermined pixel pitch with the wiring portions of the video signal lines along the Y direction. Accordingly, the concavities and convexities on the surface of the pixel area can be simulated in the seal area in which the wiring portions of the video signal lines are formed. Accordingly, the flatness of the surface of the first substrate can be enhanced.

According to another aspect of the electro optical device of the invention, a plurality of scanning lines provided in the pixel area, a plurality of data lines provided so as to cross the plurality of scanning lines each other and divided into blocks for each N (herein, N is an integer not less than 2), and a selection circuit including a plurality of switches each corresponding to corresponding one of the plurality of data lines, selecting one data line for each the block, and outputting the video signal supplied from the video signal line corresponding to the block to which the selected data line belongs among the plurality of video signal lines to the selected data line are included on the first substrate.

According to the aspect, the distance between the wiring portions of the adjacent video signal lines along the Y direction in the seal area is larger than a predetermined pixel pitch. Accordingly, the flatness of the first substrate can be effectively enhanced by arranging the dummy lines between the wiring portions of the adjacent video signal lines along the Y direction.

According to another aspect of the electro optical device of the invention, the wiring portion is formed by a plurality of conducting films mutually disposed in different layers through an interlayer insulation film, and each of the plurality of dummy wirings is formed by the same films as the plurality of conducting films.

According to the aspect, the dummy liens are formed by the same films as the plurality of conducting films constituting the wiring portions of the video signal lines. That is, when the wiring portion of the video signal line is formed by double wirings with two conducting films, the dummy line is also formed by the double wirings formed by the two conducting films. Accordingly, the difference between the concavities and convexities caused by the wiring portions and the concavities and convexities caused by the dummy lines in the seal area of the firs substrate can be reduced and the flatness of the surface of the first substrate can be further enhanced.

According to another aspect of the electro optical device of the invention, the plurality of dummy wirings are formed so that a wiring width thereof is to be mutually equal to a wiring width of the plurality of the video signal lines.

According to the aspect, the difference between the concavities and convexities caused by the wiring portions and the concavities and convexities caused by the dummy lines in the seal area of the firs substrate can be further reduced. This allows further enhancing of the flatness of the surface of the first substrate.

According to another aspect of the electro optical device of the invention, a constant potential line for supplying a constant potential is included on the first substrate, and wherein the plurality of dummy wirings are electrically connected to the constant potential line.

According to the aspect, the plurality of dummy lines are electrically connected to the constant potential line which supplies a constant potential, for example, ground potential or the like. Accordingly, the plurality of dummy lines function as a shielding film for reducing electromagnetic interference between adjacent signal lines, for example, the adjacent video signal lines. Accordingly, mutual negative influence between, for example, adjacent video signals caused by the electromagnetic noise can be reduced or prevented.

Note that the constant potential line may be, for example, a power source potential line for supplying power source to a scanning line driving circuit for driving scanning lines or may be a counter electrode potential line for supplying a predetermined voltage to the counter electrodes.

Note that the plurality of dummy wirings may be electrically connected to a predetermined potential line for supplying a predetermined potential signal in which the potential of the signal is changed to a predetermined potential for each constant period, for example, is reversed at a constant cycle. When attention is focused on each constant period, the potential of the signal is constant also in this case. Accordingly, effect of reducing the electromagnetic interference equivalent to the one described above can be properly provided.

In order to solve the above described problems, an electronic apparatus of the invention includes the electro optical device of the invention described above.

According to the electronic apparatus of the invention, as is equipped with the electro optical device of the above described invention, various kinds of electronic apparatus, such as a projection type display apparatus, a cellular phone, an electronic organizer, a word processor, a view finder type or a monitor direct view type video tape recorder, a workstation, a television phone, a POS terminal, a touch panel, and the like which enables to display with high-definition can be provided. Further, an electrophoresis device, for example, an electronic paper and the like and the like can be provided as the electronic apparatus of the invention.

The operation and the other benefits of the invention will become apparent from an embodiment described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the accompanying drawings. In the embodiment described below, a liquid crystal device of a TFT active matrix driving system which is an example of an electro optical device of the invention will be exemplified.
First Embodiment A liquid crystal device according to a first embodiment will be described with reference to FIGS. 1 to 6.

First, the whole structure of the liquid crystal device according to the embodiment will be described with reference to FIGS. 1 and 2. Here, FIG. 1 is a plan view showing the whole structure of the liquid crystal device according to the embodiment and FIG. 2 is a cross sectional view taken along the line II-II of FIG. 1.

Figure 1:
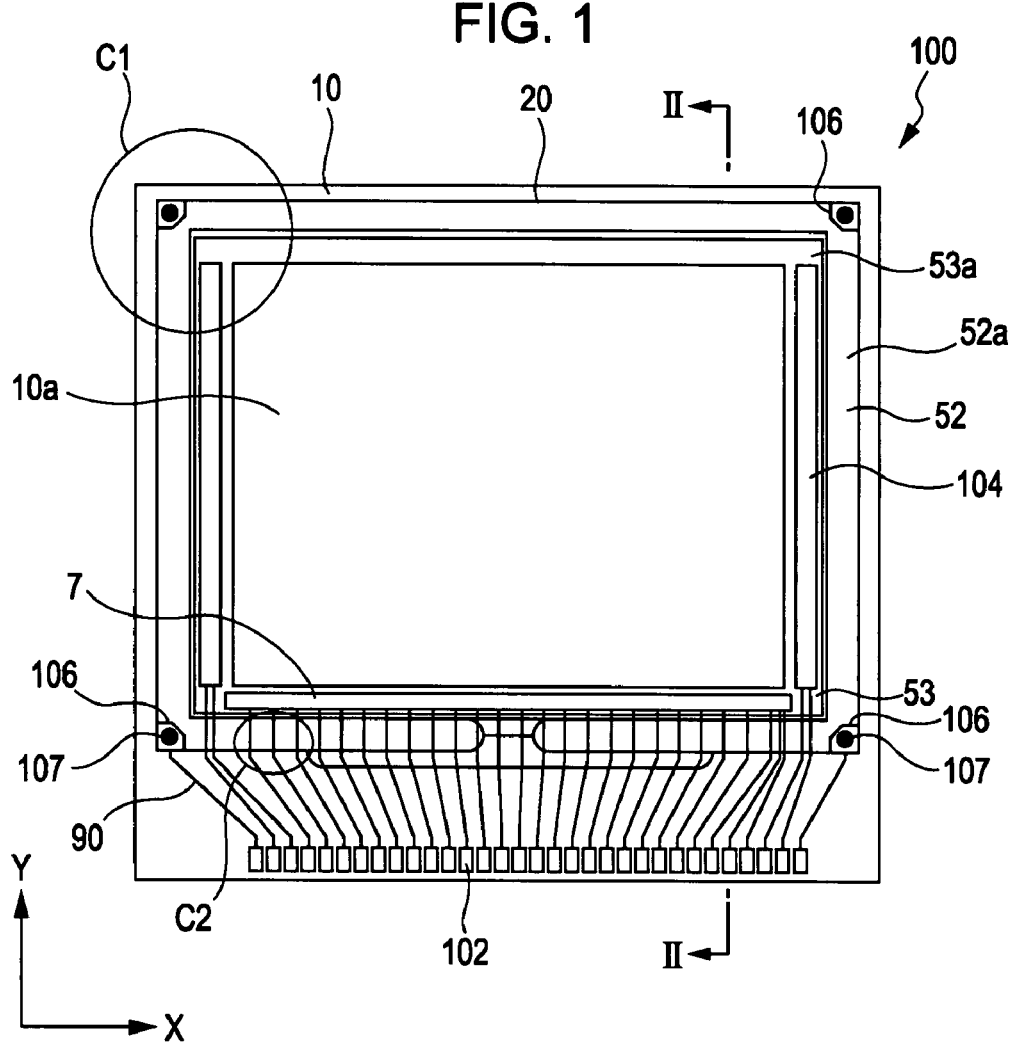
FIG. 1 is a plan view showing a whole structure of a liquid crystal device according to a first embodiment.
Figure 2:
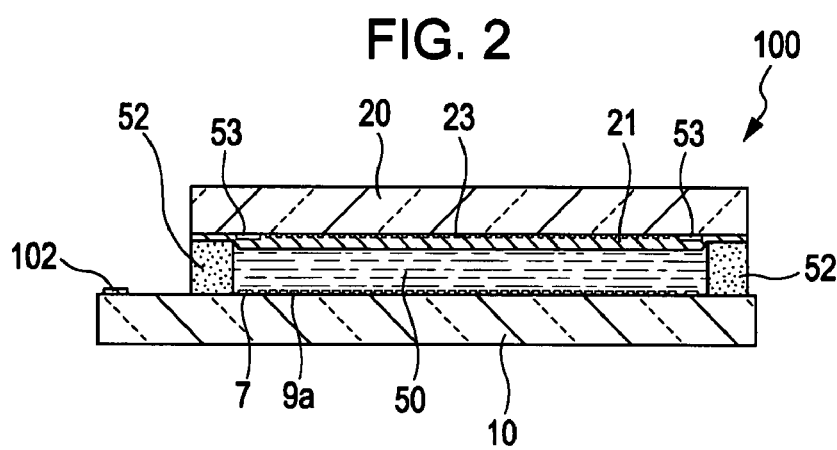
FIG. 2 is a cross sectional view taken along the line II-II of FIG. 1.

In FIGS. 1 and 2, a TFT array substrate 10 and a counter substrate 20 are oppositely disposed in a liquid crystal device 100 according to the embodiment. Note that, the TFT array substrate 10 is an example of "the first substrate" according to the invention and the counter substrate 20 is an example of "the second substrate" according to the invention. A liquid crystal layer 50 is enclosed between the TFT allay substrate 10 and the counter substrate 20 and the TFT array substrate 10 and the counter substrate 20 are mutually adhered by a sealing material 52 provided in a seal area 52a positioned around an image display area 10a as an example of "the pixel area" according to the invention. The sealing material 52 is formed by an ultraviolet cured resin for bonding the both substrates together and applied on the TFT array substrate 10 in the manufacturing process and thereafter cured by ultraviolet exposure. In addition, a gap material such as a glass fiber, a glass bead or the like are dispersed in the sealing material 52 so as to define the distance between the TFT array 10 and the counter substrate 20 (the gap between the substrates) at a predetermined value.

In FIG. 1, a light shielding frame film 53 having light blocking effect for defining a frame area 53a of the image display area 10a is formed at the counter substrate 20 side in parallel with the inside of the seal area in which the sealing material 52 is disposed. In the region positioned outside the seal area 52a in which the sealing material 52 is disposed among a periphery region, external circuit connecting terminals 102 including video signal terminals to which a video signal is supplied is provide along one side of the TFT array substrate 10. A demultiplexer 7 as an example of "the selection circuit" according to the invention is provided so as to be covered by the light shielding frame film 53 on the inside of the seal area along the one side. In addition, scanning line driving circuits 104 are provided on the inside of the seal area 52a along the two sides adjacent to the one side so as to be covered by the light shielding frame film 53. Moreover, upper and lower conducing terminals 106 for connecting the both substrates with upper and lower conductive materials 107 are disposed in regions opposing the four corners of the counter substrate 20 on the TFT array substrate 10. The electrical conduction between the TFT array substrate 10 and the counter substrate 20 can be provided therewith.

Drawing wirings 90 for electrically connecting the external circuit connecting terminals 102 to the demultiplexer 7, the scanning line driving circuits 104, the upper and lower conducing terminals 106, and the like are formed on the TFT array substrate 10.

In FIG. 2, a laminated structure in which pixel switching TFTs which are driving elements and wirings such as scanning lines, data lines, and the like are created is formed on the TFT array substrate 10. Pixel electrodes 9a are formed in the image display area 10a on the upper layer of the pixel switching TFTs and the wirings such as the scanning lines, the data lines, and the like. An aliment layer is formed on the pixel electrodes 9a. Further, a plurality of dummy wirings described below are formed in the seal area 52a. On the other hand, a light shielding film 23 is formed on the surface of the counter substrate 20 opposing the TFT array substrate 10. Then, counter electrodes 21 formed by a transparent material such as ITO or the like is formed on the light shielding film 23 so as to be opposed to the plurality of pixel electrodes 9a. An alignment layer is formed on the counter electrodes 21. Further, the liquid crystal layer 50 is made of, for example, one kind of nematic liquid crystal or a mixture of plural kinds of nematic liquid crystals. A predetermined aliment state is provided between the pair of the aliment layers.

Note that, although not shown in the drawings, a detecting circuit for detecting the quality, defection or the like of the liquid crystal device during manufacturing or before shipping, a detecting pattern, or the like may be formed on the TFT array substrate 10 besides the demultiplexer 7 and the scanning line driving circuits 104.

Next, an electrical structure of the liquid crystal device according to the embodiment will be described with reference to FIG. 3. Here, FIG. 3 is a circuit diagram for showing an electrical structure of the liquid crystal device according to the embodiment.

Figure 3:
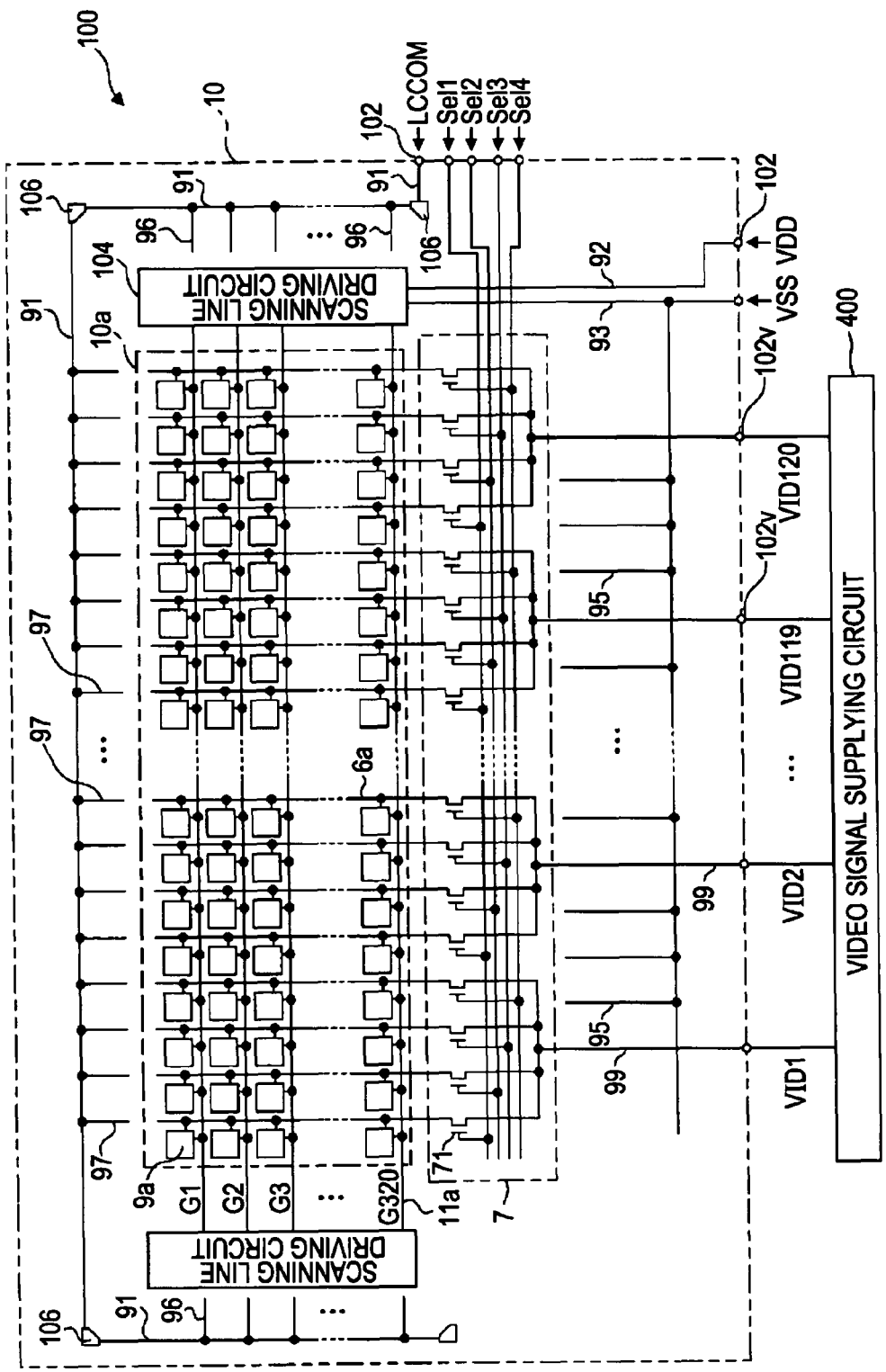
FIG. 3 is a circuit diagram showing an electrical structure of the liquid crystal device according to the first embodiment.

In FIG. 3, the liquid crystal device 100 includes the demultiplexer 7 and the scanning line driving circuits 104 on the TFT array substrate 10. Further, on the TFT array substrate 10, an counter electrode potential line 91 as an example of "the constant potential line" according to the invention for supplying a counter electrode potential LCCOM to the upper and lower conducting terminals is formed. A video signal supplying circuit 400 as an external circuit is connected to video signal terminals 102v among the external circuit connecting terminals 102 on the TFT array substrate 10.

In the image display area 10a on the TFT array substrate 10, 320 rows of scanning lines 11a are provided so as to extend in the row direction (that is, the X direction) and 480 (=120×4) columns of data lines 6a grouped for every four lines are provided so as to extend in the column direction (that is, the Y direction) and to keep mutual electrical isolation with the scanning lines 11a. Note that the numbers of the scanning lines 11a and the data lines 6a are not respectively restricted to 320 and 480. The number of the data lines constituting one group shall be "four" in the embodiment. However, any number which is not less than "two" may be employed.

The pixel electrodes 9a are respectively arranged so as to correspond to the crossover sites of the 320 scanning lines 11a and the 480 data lines 6a. Accordingly, in the embodiment, the pixel electrodes 9a are arranged in a matrix manner of 320 rows in a transverse direction and 480 columns in a longitudinal direction at a predetermined pixel pitch. Note that, although omitted in FIG. 3, pixel switching TFTs for controlling the conduction state and non conduction state between each pixel electrode 9a and the data lines 6a in accordance with each scanning signal supplied thereto via the scanning lines 11a and capacity wirings for storing capacity for keeping the voltage applied to the pixel electrodes 9a for a long period are formed between each of the pixel electrodes 9a and the data lines 6a.

In the embodiment, in order to distinguish four columns of data lines 6a constituting one group, the four columns may be respectively called as a, b, c, and d series from the left. Specifically, the a-series refers to the data lines 6a of 1, 5, 9, . . . , 477 columns, the b-series refers to the data lines 6a of 2, 6, 10, . . . , 478 columns, the c-series refers to the data lines 6a of 3, 7, 11, . . . , 479 columns, and the d-series refers to the data lines 6a of 4, 8, 12, . . . , 480 columns.

In FIG. 3, the scanning line driving circuits 104 supply scanning signals G1, G2, G3, . . . , G320 to the scanning lines 11a of 1,2,3, . . . 320 rows. Specifically, the scanning line driving circuits 104 select the scanning lines 11a of 1,2, 3, . . . 320 rows by rotation over one frame period, apply the scanning signal having H level corresponding to a selection voltage to the selected scanning line, and apply the scanning signals having L level corresponding to a non selection voltage to the other scanning lines. In the embodiment, a low power source potential VSS (for example, 0 volt) lower than the counter electrode potential LCCOM is supplied to the scanning line driving circuit 104 from an external power source via a low power source potential line 93 and a high power source potential VDD (for example, 15 volt) higher than the counter electrode potential LCCOM is supplied to the scanning line driving circuit 104 via a high power source potential line 92. That is, the L level of the scanning signal is the low power source potential VSS and the H level of the scanning signal is the high power source potential VDD. Note that, the low power source potential line 93 is an example of "constant potential line" according to the invention.

The video signal supplying circuit 400 is separately constructed from the TFT array substrate 10 and connected to the TFT array substrate 10 via the video signal terminals 102v during the display operation. The video signal supplying circuit 400 outputs the video signal having a voltage corresponding to a gray scale of a pixel in which a pixel electrode 9a is included with respect to the pixel electrode 9a corresponding to the scanning line 11a selected by the scanning line driving circuits 104 and the data lines 6a selected by the demultiplexer 7 among the four columns of data lines 6a belonging to each group.

Note that, in the embodiment, as described above, the number of columns of the data lines 6a is "480" and the data lines 6a are grouped for each four columns, so that the number the video signal terminals 102v is "120".

The demultiplexer 7 is constructed to include TFTs 71 provided for each data line 6a. Here, the TFT 71 is an n-channel type, and the each drain is connected to one end of the data line 6a, and the sources of four TFTs 71 corresponding to the data lines 6a of the same group are commonly connected and a video signal corresponding to the group is supplied thereto.

That is a group of m (here, m is an integer not less than 1 and not more than 120) is constituted by the data lines of (4m−3) column of a-series, (4m−2) column of b-series, (4m−1) column of c-series, and (4m) column of d-series, so that the sources of the TFTs 71 corresponding to the four columns of data lines 6a are commonly connected and an video signal VID (m) is supplied thereto. A control signal Sel1 is supplied to the gate of the TFT 71 corresponding to the data line 6a of (4m−3) column, and similarly, each of control signals Sel2, Sel3, and Sel4 is supplied to corresponding one of the gates of the TFTs 71 corresponding to the data lines 6a of (4m−2) (4m−1) (4m) columns. Note that the control signals Sel1, Sel2, Sel3, and Sel4 are supplied from a timing controlling circuit as an external circuit omitted in the drawings via the external circuit connecting terminals 102.

Herein, the operation of the liquid crystal device constructed as described above will be described.

The scanning line driving circuit 104 sequentially exclusively applies H level (that is, selection voltage) to the scanning signals G1, ..., G320 over a period of one frame (n frame) for each one horizontal period.

Here, the control signals Sel1, Sel2, Sel3, and Sel4 supplied from the timing controlling circuit becomes exclusively H level in this order in one horizontal period and the video signal supplying circuit 400 supplies video signals VID1, VID2, VID3, ..., VID120, in synchronization with the supply.

Specifically, during the period that the scanning signal Gi of i-row becomes H-level, when the control signal Sel1 becomes H level, the video signal supplying circuit 400 concurrently outputs video signals VID1, VID2, VID3, ..., VID120 each having a high potential or a low potential with respect to the counter electrode potential LCCOM by a voltage corresponding to a pixel gray scale corresponding to the crossover site of the i-row scanning line 11a and a-series data lines 6a in response to the groups of 1, 2, 3, ..., 120. At this time, only the control signal Sel1 is in H level, so that the data lines 6a of the a-series are selected (that is, only the TFTs 71 corresponding to the data lines 6a of the a-series become ON). As a result, the video signals VID1, VID2, VID3, ..., VID120 are respectively supplied to the data lines 6a of the a-series (1, 5, 9, 477 columns). On the other hand, when the scanning signal Gi is H level, in all of the pixels positioned at i-row, the pixel switching TFTs become on (conducting) state. As a result the video signals VID1, VID2, VID3, ..., VID120 supplied to the data lines 6a of the a-series are to be respectively applied to the pixel electrodes 9a of i-row 1-column, i-row 5-column, i-row 9-column, ..., i-row 477-column.

Next, when the control signal Sel2 becomes H level, the video signal supplying circuit 400 concurrently outputs video signals VID1, VID2, VID3, ..., VID120 each having a voltage corresponding to a pixel gray scale corresponding to the crossover site of the i-row scanning line 11a and the b-series data lines 6a in response to the groups of 1, 2, 3, ..., 120. At this time, only the control signal Sel2 is in H level, so that the data lines 6a of the b-series are selected. As a result, the video signals VID1, VID2, VID3, ..., VID120 are respectively supplied to the data lines 6a of the b-series (2, 6, 10, ..., 478 columns) and are to be respectively applied to the pixel electrodes 9a of i-row 2-column, i-row 6-column, i-row 10-column, ..., i-row 478-column.

Similarly, during the period that the scanning signal Gi of i-row becomes H-level, when the control signal Sel3 or Sel4 becomes H level, the video signal supplying circuit 400 concurrently outputs video signals VID1, VID2, VID3, ..., VID120 each having a voltage corresponding to a pixel gray scale corresponding to the crossover site of the i-row scanning line 11a and the c-series data lines 6a or the d-series data lines 6a in response to the groups of 1, 2, 3, ..., 120. Herewith, the video signals VID1, VID2, VID3, VID120 are supplied to the data lines 6a of the c-series (3, 7, 11, ..., 479 columns) and are respectively applied to the pixel electrodes 9a of i-row 3-column, i-row 7-column, i-row 11-column, ..., i-row 479-column, and continuously, supplied to the data lines 6a of the d-series (4, 8, 12, ..., 480 columns) and are respectively applied to the pixel electrodes 9a of i-row 4-column, i-row 8-column, i-row 12-column, ..., i-row 480-column.

Herewith, the operation for writing the voltage of the video signal corresponding to gray scale is concluded with respect to the pixels of i-row. Note that the voltage applied to the pixel electrodes 9a are kept until the writing of next (n+1) frame by the liquid crystal capacitance even when the scanning signal Gi becomes L level.

Figure 4:
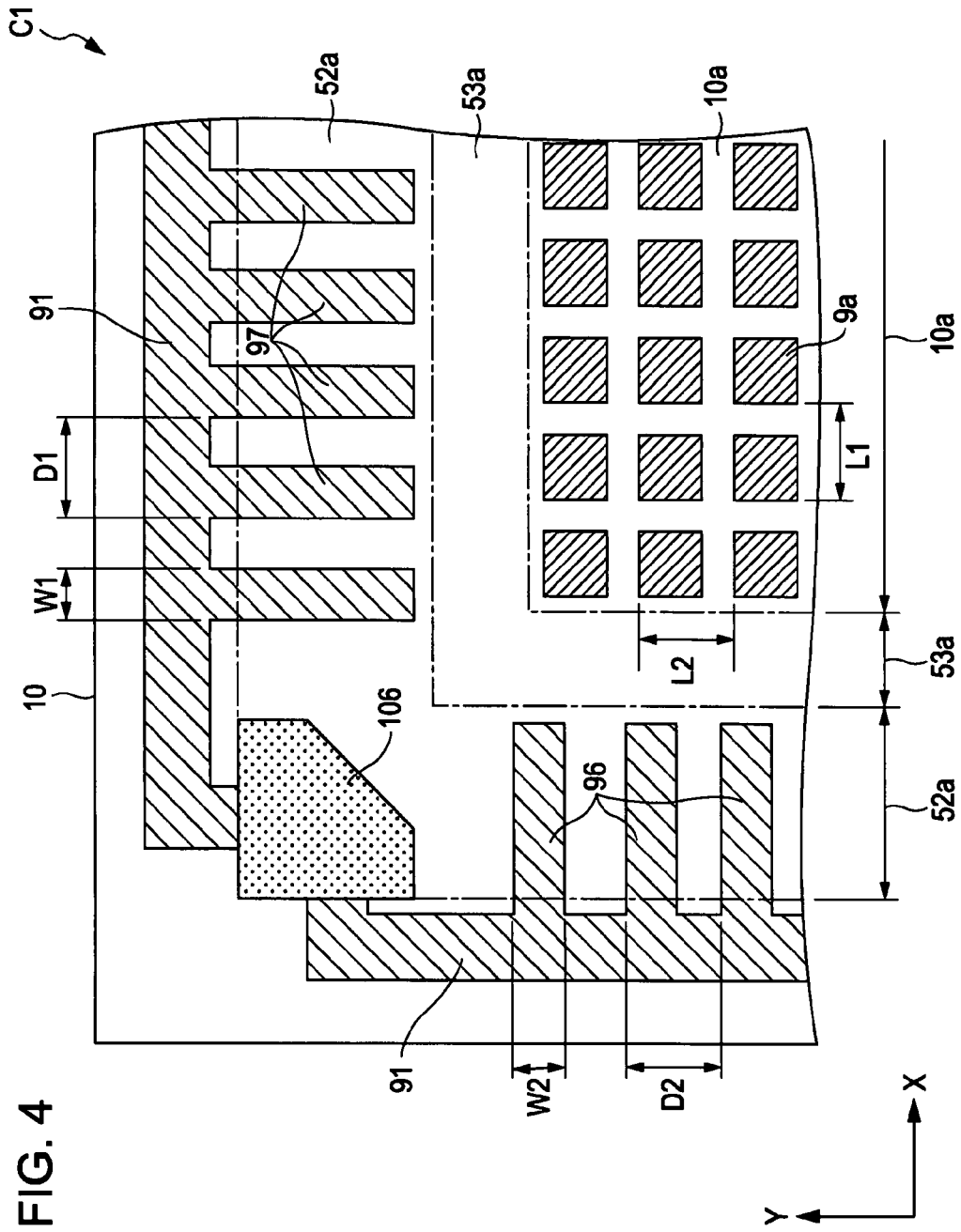
FIG. 4 is a plan view showing a layout of dummy wirings in the region C1 in FIG. 1.
Figure 5:
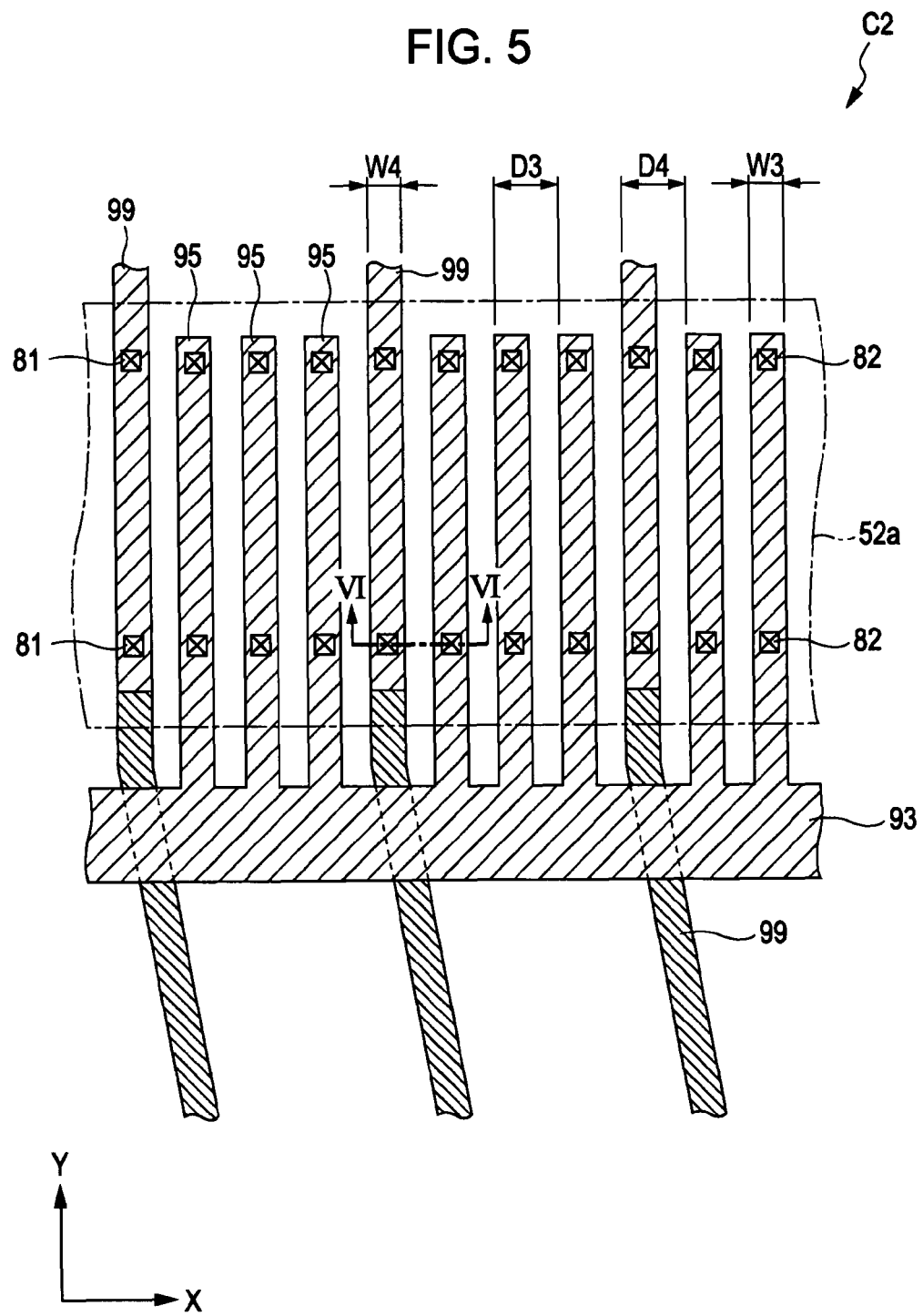
FIG. 5 is a plan view showing a layout of dummy wirings in the region C2 in FIG. 1.
Figure 6:
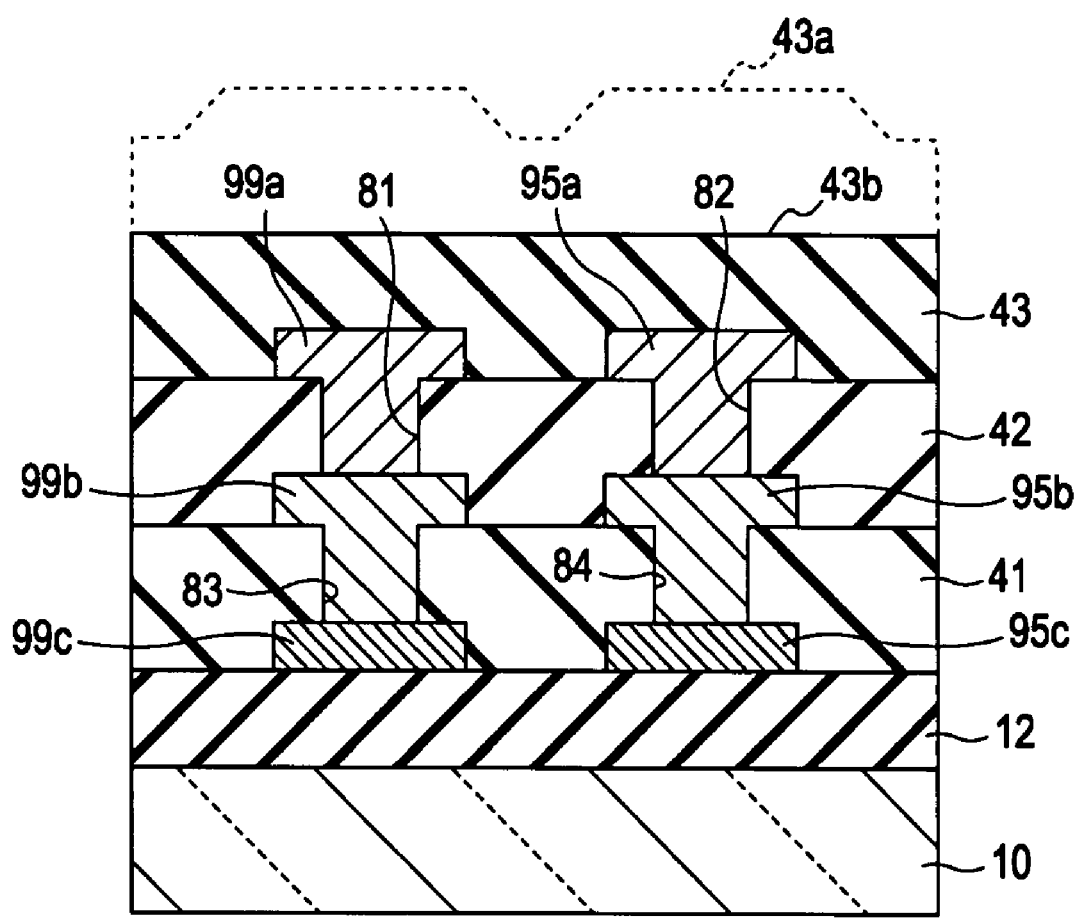
FIG. 6 is a cross sectional view taken along the line VI-VI of FIG. 5.

Next, dummy wirings of the liquid crystal device according to the embodiment will be described in detail with reference to FIGS. 4 to 6 in addition to FIG. 3. Here, FIG. 4 is a plan view for showing a layout of the dummy wirings in the region C1 in FIG. 1. FIG. 5 is a plan view for showing a layout of the dummy wirings in the region C2 in FIG. 1. FIG. 6 is a cross sectional view taken along the line VI-VI of FIG. 5.

As shown in FIGS. 3 to 5, particularly in the embodiment, a plurality of dummy wirings 95, 96, and 97 are provided on the TFT array substrate 10. The plurality of dummy wirings 95, 96, and 97 are respectively formed so as to overlap at least a part of the seal area 52a.

To be more specific, in FIGS. 3 and 4, the plurality of the dummy wirings 96 are formed by, for example, the same film as the conducting film constituting the data lines 6a and the like. The plurality of dummy wirings 96 are respectively formed so as to extend in the X direction in the region along the Y direction among the seal area 52a surrounding the image display area 10a (that is, the area positioned at left and right sides of the image display area 10a among the seal area 52a in FIG. 1) and arranged along the Y direction at an arrangement pitch D2 equivalent to a pixel pitch L2 at which the pixel electrodes 9a are arranged along the Y direction. In the embodiment, both of the pixel pitch L2 and the arrangement pitch D2, and a pixel pitch L1 and an arrangement pitch D1 described below are about 10 um and both of a wiring width W2 of the plurality of dummy wirings 96 and a wiring width W1 of the plurality of dummy wirings 97 described below are about 5 um. The plurality of dummy wirings 96 are connected to the counter electrode potential line 91 and the counter electrode potential LCCOM is supplied thereto.

The plurality of dummy wirings 97 are formed, for example, by the same film as the conducting film constituting the data lines 6a or the like. The plurality of dummy wirings 97 are formed so as to extend along the Y direction in the region along the X direction positioned opposite to the external circuit connecting terminals 102 with respect to the image display area 10a among the seal area 52a surrounding the image display area 10a (that is, the area positioned on the upper side of the image display area 10a among the seal area 52a in FIG. 1). The plurality of dummy wirings 97 are arranged along the X direction at the arrangement pitch D1 equivalent to the pixel pitch L1 at which the pixel electrodes 9a are arranged along the X direction. The plurality of dummy wirings 97 are connected to the counter electrode potential line 91 and the counter electrode potential LCCOM is supplied thereto.

In FIGS. 3 and 5, the plurality of dummy wirings 95 are formed by the same layer as the plurality of conductive layers constituting the video signal lines 99.

Specifically, as shown in FIGS. 5 and 6, the video signal line 99 is formed by three wiring layers 99a, 99b, and 99c respectively disposed at different layers through the interlayer insulating films. The wiring layer 99c is constituted by the same film as the conducting film constituting the scanning line 11a and formed on a ground insulating film 12 on the TFT array substrate 10. The wiring layer 99b is constituted by a conducting film disposed on the upper side of the wiring layer 99c through an interlayer insulating film 41 and is electrically connected to the wiring layer 99c via a contact hole 83 opened in the interlayer insulating film 41. The wiring layer 99a is constituted by a conducting film disposed on the upper side of the wiring layer 99b through an interlayer insulating film 42 and is electrically connected to the wiring layer 99b via a contact hole 81 opened in the interlayer insulating film 42. The wiring layer 99a and the wiring layer 99b cross another lines (for example, low power source potential line 93 formed by the same film as the wiring layer 99a) while keeping electrical insulating state. Accordingly, the wiring layer 99a and the wiring layer 99b are not formed on the external circuit connecting terminals 102 (see FIG. 1) side than the seal area 52a (see FIG. 5). In this manner, the video signal line 99 is formed as a triple wiring formed by the three wiring layers 99a, 99b, and 99c electrically connected to each other.

The dummy wiring 95 has the same laminated structure as the video signal line 99 in the seal area 52a. That is, the dummy wiring 95 is formed by three wiring layers 95a, 95b, and 95c. The wiring layer 95c is constituted by the same film as the wiring layer 99c. The wiring layer 95b is constituted by the same film as the wiring layer 99b and electrically connected to the wiring layer 95c via a contact hole 84 opened in the interlayer insulating film 41. The wiring layer 95a is constituted by the same film as the wiring layer 99a and electrically connected to the wiring layer 95b via a contact hole 82 opened in the interlayer insulating film 42. In this manner, the dummy wiring 95 is formed as a triple wiring formed by the three wiring layers 95a, 95b, and 95c electrically connected to each other.

In FIGS. 3 and 5, the plurality of dummy wirings 95 are arranged along the X direction at an arrangement pitch D3 equivalent to the pixel pitch L1 (see FIG. 4) at which the pixel electrodes 9a are arranged along the X direction between the adjacent video signal lines 99 in the region along the X direction positioned at the same side as the outside circuit connecting terminals 102 with respect to the image display area 10a among the seal area 52a surrounding the image display area 10a (that is, the region positioned on the lower side of the image display area 10a among the seal area 52a in FIG. 1). In the embodiment, a wiring width L3 of the plurality of dummy wirings 95 and a wiring width W4 of the video signal lines 99 are about 5 um. The plurality of dummy wirings 95 are connected to the low power source potential line 93 and the low power source potential VSS is supplied thereto.

That is, particularly in the embodiment, the plurality of dummy wirings 95, 96, and 97 formed by, for example, the same films as the conducting films constituting the data lines 6a are arranged at the arrangement pitch equivalent to the pixel pitch L1 (that is, the pixel pitch L2 equivalent thereto in the embodiment) along the periphery of the image display area 10a in the seal area 52a. Accordingly, the difference between concavities and convexities which may be generated on the surface of the TFT array substrate 10 in the seal area 52a and concavities and convexities which may be generated on the surface of the TFT array substrate 10 in the image display area 10a can be reduced. That is, the concavities and convexities caused by the laminate structure in the image display area 10a can be simulated by the plurality of dummy wirings 95, 96, and 97 arranged at the arrangement pitch equivalent to the pixel pitch L1 in the seal area 52a. In other words, with the plurality of dummy wirings 95, 96, and 97, the concavities and convexities on the surfaces of the seal area 52a and the image display area 10a on the TFT array substrate 10 can be almost evenly or perfectly evenly generated. Accordingly, by subjecting a planarization process such as CMP or the like with respect to the concavities and convexities generated on the surface of the TFT array substrate 10 (or the surface of the interlayer insulating film on the lower side than the pixel electrodes 9a laminated on the TFT array substrate 10), the flatness of the surface of the TFT array substrate 10 after removal of the concavities and convexities can be enhanced. Herewith, the possibility of the occurrence of the disturbance in the alignment state of the liquid crystal layer 50 (see FIG. 2) can be reduced. Moreover, the failure to keep the TFT array substrate 10 and the counter substrate 20 at a predetermined distance with the sealing material 52 (in other words, the gap material included in the sealing material 52) caused by the concavities and convexities on the surface in the seal area 52a on the TFT array substrate 10 can be reduced or prevented.

Moreover, particularly in the embodiment, the plurality of dummy wirings 95, 96, and 97 are arranged at the arrangement pitch equivalent to the pixel pitch L1 (or pixel pitch L2). Accordingly, the sealing material 52a can be evenly cured when the sealing material 52a formed by an optical-setting resin is cured by emitting ultraviolet ray (UV light) from the TFT array substrate 10 side. That is, the sealing material 52 can be cured by almost evenly or practically perfectively evenly transmitting the light emitted from the TFT array substrate 10 side through the gaps between the adjacent dummy wirings 95, 96, and 97 provided for each pixel pitch. Accordingly, the adherence force by the sealing material 52 can be enhanced. Accordingly, the TFT array substrate 10 and the counter substrate 20 can be strongly adhered by the sealing material 52. Herewith, the deterioration of, for example, the alignment layer formed in the image display area 10a caused by a foreign object such as moisture or the like invaded from the external of the device can be reduced and the reliability of the device can be enhanced.

In addition, as shown in FIG. 5, particularly in the embodiment, the plurality of dummy wirings 95 are arranged between the adjacent video signal lines 99 in the seal area 52a so that the arrangement pitch D4 with the video signal lines 99 becomes equivalent to the pixel pitch L1. That is, the plurality of dummy wirings 95 are arranged at the arrangement pitch equivalent to the pixel pitch L1 with wiring portions of the video signal lines 99 along the Y direction in the seal area 52a. Accordingly, the concavities and convexities on the surface in the image display area 10a can be increasingly surely simulated in the region in which the video signal lines 99 are formed among the seal area 52a (that is, the region positioned on the lower side of the image display area 10a among the seal area 52a). Accordingly, the flatness of the surface of the TFT array substrate 10 can be increasingly enhanced. Particularly, when the liquid crystal device 100 is constructed as a hybrid system using the demultiplexer 7 as in the embodiment, one video signal line 99 corresponds to N (four in the embodiment) data lines 6a constituting one group. Accordingly, the distance between the portions of the adjacent video signal lines 99 along the Y direction becomes larger than the pixel pitch L1. Accordingly, to enhance the flatness of the surface of the TFT array substrate 10 by providing the plurality of dummy wirings 95 between the wiring portions of the adjacent video signal lines 99 along the Y direction is particularly available in the liquid crystal device of the hybrid system in the embodiment.

As described above with reference to FIGS. 5 and 6, particularly in the embodiment, the dummy wiring 95 has a laminated structure equivalent to the video signal line 99 in the seal area 52a. That is, the dummy wiring 95 is constituted as the triple wiring from the wiring layers 95a, 95b, and 95c similarly as the video signal line 99 constituted as the triple wiring from the wiring layers 99a, 99b, and 99c in the seal area 52a. Accordingly, the difference between the concavities and convexities generated on the surface of the interlayer insulation film 43 caused by the video signal lines 99 and the concavities and convexities generated on the surface of the interlayer insulation film 43 caused by the dummy wirings 95 in the seal area 52a can be reduced. Accordingly, the flatness of the surface (in other words, the surface 43b of the interlayer insulation film 43) on the TFT array substrate 10 after subjecting flatness treatment such as CMP or the like can be further enhanced. To be more specific, in the embodiment, a laminated structure whose top is the interlayer insulation film 43 is formed on the TFT array substrate 10 and thereafter flatness treatment such as CMP or the like is subjected. Then, the pixel electrodes 9a are formed in the image display area 10a on the surface of the interlayer insulation film 43, and the sealing material 52 is disposed in the seal area 52a and bonded to the counter substrate 20. Herein, concavities and convexities 43a caused by the video signal lines 99 and the dummy wirings 95 disposed on the lower side of the interlayer insulation film 43 are formed on the surface of the interlayer insulation film 43 right after formation of the laminated structure whose top is the interlayer insulation film 43 (that is before subjecting flatness treatment such as CMP or the like). Here, in the embodiment, the dummy wiring 95 has the laminated structure equivalent to that of the video signal line 99. Accordingly, the concavities and convexities 43a are formed as the concavities and convexities in which the concavities and convexities caused by the video signal lines 99 and the concavities and convexities caused by the dummy wirings 95 are matched. Accordingly, the concavities and convexities 43a can be almost evenly or perfectly evenly removed by the flatness treatment such as CMP or the like, which makes it possible to form the surface 43b having a further high flatness.

Further, as described above with reference to FIGS. 3 and 5, particularly in the embodiment, the plurality of dummy wirings 95 are respectively electrically connected to the low power source potential line 93 to which the low power source potential VSS is supplied. Accordingly, the plurality of dummy wirings 95 function as a shielding film for reducing electromagnetic interference between the adjacent video signal lines 99 in the seal area 52a. Accordingly, mutual negative influence between the adjacent video signals 99 caused by electromagnetic noise in the seal area 52a can be reduced.

As described above, in the liquid crystal device 100 according to the embodiment, the plurality of dummy wirings 95, 96, and 97 are arranged at the arrangement pitch equivalent to the pixel pitch L1 (or the pixel pitch L2) in the seal area 52a on the TFT array substrate 10, so that the concavities and convexities caused by the laminated structure in the image display area 10a can be simulated and the flatness of the surface on the TFT array substrate 10 can be enhanced. Accordingly, the possibility of the occurrence of the disturbance in the alignment state of the liquid crystal layer 50 can be reduced and the TFT array substrate 10 and the counter substrate 20 can be surely kept at a predetermined distance by the sealing material 52.

Electronic Apparatus

Next, a case in which the liquid crystal device which is the aforementioned electro optical device is applied to various kinds of electronic apparatuses will be described.

Figure 7:
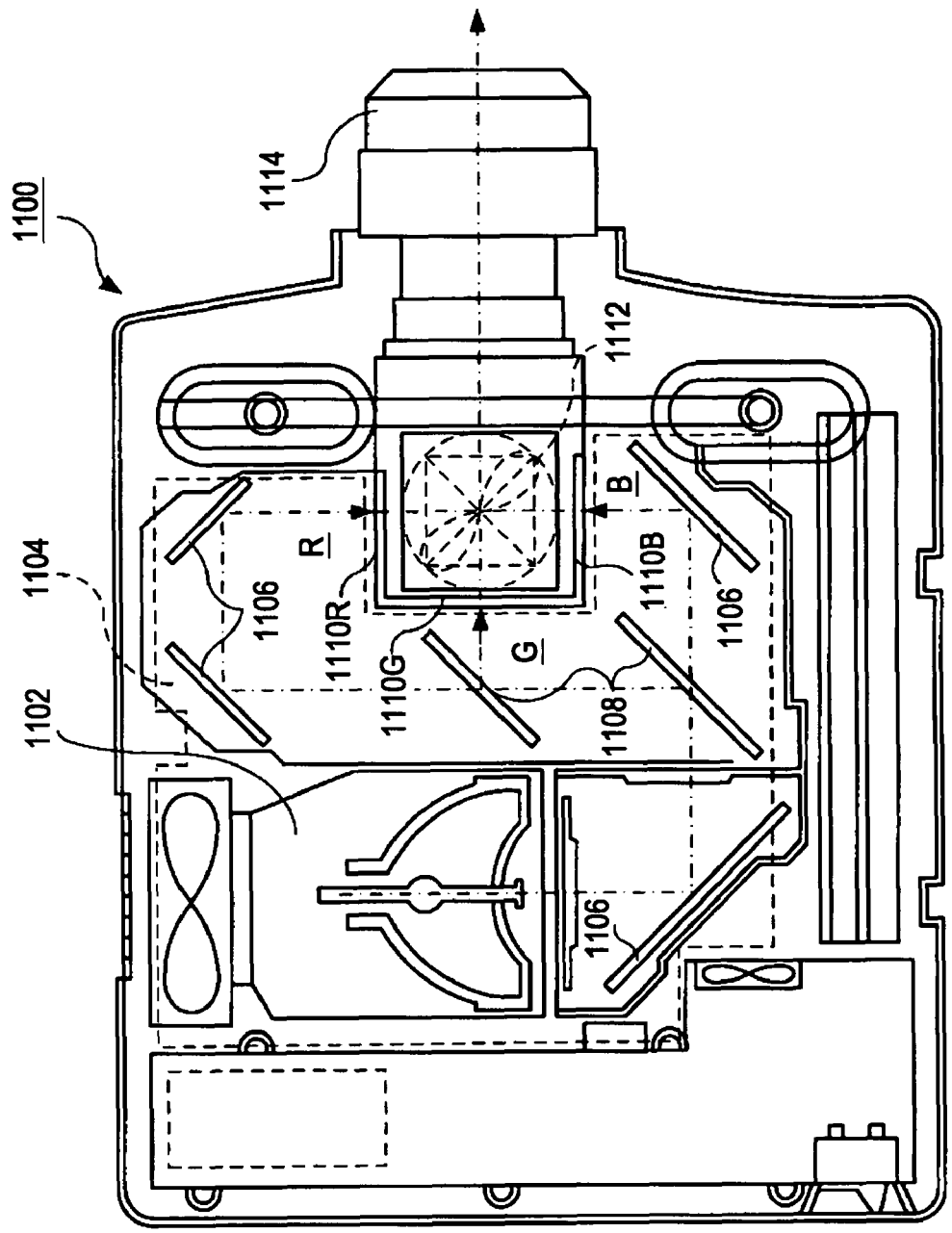
FIG. 7 is a plan view showing a structure of a projector which is an example of an electronic apparatus to which the electro optical device is applied.

First, a projector in which the liquid crystal device is used as a light valve will be described. FIG. 7 is a plan view showing a structure of the projector. As shown in FIG. 7, a lamp unit 1102 formed by a white light source such as a halogen lamp, etc. is provided on the inside of a projector 1100. The projection light emitted from the lamp unit 1102 is separated into three primary colors, RGB, by four mirrors 1106 and two dichroic mirrors 1108 disposed in a light guide 1104, and enters into liquid crystal panels 1110R, 1110B, and 1110G, each of which serves as a light valve corresponding to each primary color.

The structure of the liquid crystal panels 1110R, 11110B, and 1110G is the same as the above described liquid crystal panel, and the individual panels are respectively driven by primary color signals of R, G, and B, supplied from a video signal processing circuit. Then, each light modulated by one of these liquid crystal panels enters into a dichroic prism 1112 from three directions. The R and B light are deflected 90 degrees via the dichroic prism 1112, while the G light goes straight through. Accordingly, each color image is synthesized. As a result, a color image is projected onto a screen, etc. through a projection lens 1114.

Here, when attention is focused on the display image by each of the liquid crystal panels 1110R, 1110G, and 1110B, the display image by the liquid crystal panel 1110G needs to be horizontally reversed with respect to the display images by the liquid crystal panels 1110R and 1110B.

Note that, the light corresponding to each primary colors R, G, and B enters into the liquid crystal display panels 1110R, 1110G, and 1110B by the dichroic mirrors 1108, and thus it is not necessary to dispose color filters.

Note that, besides the electronic apparatus described with reference to FIG. 7, there are included a mobile personal computer, a mobile cellular phone, a liquid crystal television, a view finder type or a monitor direct view type video tape recorder, a car navigation apparatus, a pager, an electronic organizer, an electronic calculator, a word processor, a workstation, a television phone, a POS terminal, an apparatus having a touch panel, and the like. Then, it goes without saying that the liquid crystal device can be applied to the various kinds of electronic apparatuses.

In addition, besides the liquid crystal device described in the above embodiment, the invention can be applied to a reflection type liquid crystal device (LCOS), a plasma display panel (PDP), a field emission display (FED, SED), an organic EL display, a digital micro-mirror device (DMD), an electrophoresis device and the like in which elements are formed on a silicon substrate.

The invention is not restricted to the aforementioned embodiment and modifications can be appropriately made without departing from the essence or spirit read from the claims and the whole specification. The electro optical device in which such modifications are made and the electronic apparatus including the same are also included in the technical scope of the invention.

The entire disclosure of Japanese Patent Application No. 2006-120552, filed Apr. 25, 2006 is expressly incorporated by reference herein.

What is claimed is:

1. An electro optical device comprising:
a first substrate;
a plurality of pixel electrodes arranged in a pixel area at a predetermined pixel pitch over the first substrate;
an interlayer insulation film disposed below the pixel electrodes;
scanning lines disposed below the interlayer insulation film;
data lines disposed below the interlayer insulation film, each of the data lines intersecting the scanning lines, the data lines being divided into data line blocks for each N (herein, N is an integer not less than 2) data lines;
electronic components disposed below the interlayer insulation film in the pixel area and electrically connected to the pixel electrodes, at least one of the data lines and electronic components including conducting films;
a second substrate oppositely disposed to the first substrate;

a sealing material for bonding the first substrate and the second substrate together in a seal area along a periphery of the pixel area;

video signal terminals disposed along a side of the first substrate;

video signal lines provided in a one-to-one correspondence with the data line blocks, the video signal lines passing under the sealing material and electrically connecting to the video signal terminals respectively;

a selection circuit including a plurality of switches corresponding to corresponding ones of the plurality of data lines, the selection circuit using the switches to select one data line of the corresponding data line block at a time and outputting the video signal supplied from the video signal line that corresponds to the block to the selected one data line;

a constant potential line for supplying a constant potential being included on the first substrate, the constant potential line including a portion which is arranged along an outside edge of the seal area; and dummy wirings arranged along the periphery of the pixel area, the dummy wirings being formed by the same film as the conducting films of the at least one of the data lines and the electronic components, the dummy wirings being disposed between two adjacent video signal lines where the two adjacent video signal lines pass under the sealing material, each of the dummy wirings having a portion overlapping the seal area and being electrically connected to the portion of the constant potential line, each of the dummy wirings protruding from the portion of the constant potential line toward the seal area and not protruding from the portion of the constant potential line toward the video signal terminals in plan view.

2. The electro optical device according to claim 1, wherein a video signal is supplied to the video signal terminals.

3. The electro optical device according to claim 2, wherein the plurality of dummy wirings are formed so that a wiring width thereof is to be mutually equal to a wiring width of the plurality of the video signal lines.

4. An electronic apparatus comprising the electro optical device according to claim 1.

5. The electro optical device according to claim 1, wherein switches in the selection circuit are configured to receive corresponding control signals from a timing controlling circuit, the control signals being provided in a one-to-one correspondence with each of the data lines in the data line blocks.

6. The electro optical device according to claim 1, wherein the video signal lines intersect with the constant potential line outside of the seal area.

7. The electro optical device according to claim 1, wherein each of the video signal lines has a wiring portion extending across the seal area, the wiring portion being formed by a plurality of conducting films mutually disposed in different layers with an interlayer insulation film interposed therebetween, and the portion of the dummy wirings extending across the seal area is formed by the same plurality of films as the plurality of conducting films forming the wiring portion of the video signal lines, the interlayer insulation film being interposed between the plurality of films forming the portion of the dummy wirings extending across the seal area.

* * * * *